(12) United States Patent
Davis et al.

(10) Patent No.: US 8,006,990 B1
(45) Date of Patent: Aug. 30, 2011

(54) SPRING HANGER AND METHOD FOR ATTACHMENT

(75) Inventors: John E. Davis, Hebron, NE (US); Mark R. Virus, Hebron, NE (US); Daniel O. Seacat, Belleville, KS (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 67 days.

(21) Appl. No.: 12/334,643

(22) Filed: Dec. 15, 2008

(51) Int. Cl.
*B60G 9/00* (2006.01)

(52) U.S. Cl. ....... 280/124.175; 280/124.1; 280/124.116; 280/124.128; 280/124.17; 267/260; 267/262

(58) Field of Classification Search ............... 280/124.1, 280/124.116, 124.128, 799, 86.5, 86.1, 86.752, 280/124.11, 124.153, 124.163, 124.17, 124.175, 280/124.176, 86.75, 86.751, 76.754, 76.751; 267/260, 192, 193, 229, 36.1, 39, 40, 261, 267/262, 124.17, 124.175, 271, 294
See application file for complete search history.

(56) References Cited

U.S. PATENT DOCUMENTS

| | | | | | |
|---|---|---|---|---|---|
| 3,175,819 | A | * | 3/1965 | Moreno et al. ................ | 267/262 |
| 3,285,621 | A | * | 11/1966 | Turner, Jr. .................... | 280/81.1 |
| 3,510,149 | A | * | 5/1970 | Raidel ........................ | 280/86.75 |
| 3,617,072 | A | * | 11/1971 | Turner, Jr. .................... | 280/86.5 |
| 3,730,549 | A | * | 5/1973 | Turner, Jr. .................... | 280/86.5 |
| 3,801,086 | A | * | 4/1974 | Raidel ........................... | 267/67 |
| 3,841,652 | A | * | 10/1974 | Higginson .................... | 280/682 |
| 4,000,913 | A | * | 1/1977 | Gibson ........................ | 280/86.5 |
| 4,277,087 | A | * | 7/1981 | Turner et al. ................. | 280/788 |
| 4,397,478 | A | * | 8/1983 | Jensen et al. ................ | 280/6.159 |
| RE32,486 | E | * | 9/1987 | Raidel, Jr. ................... | 280/86.75 |
| 4,889,361 | A | * | 12/1989 | Booher ...................... | 280/124.175 |
| 4,953,891 | A | * | 9/1990 | Zantinge ...................... | 280/788 |
| 5,088,763 | A | * | 2/1992 | Galazin et al. ................ | 280/656 |
| 5,104,079 | A | * | 4/1992 | Hardtke ...................... | 248/228.5 |
| 5,118,131 | A | * | 6/1992 | Manning ................ | 280/124.109 |
| 5,251,886 | A | * | 10/1993 | Bursel .......................... | 267/229 |
| 5,335,932 | A | * | 8/1994 | Pierce .......................... | 280/788 |
| 5,337,997 | A | * | 8/1994 | Hockney ...................... | 248/596 |
| 5,378,006 | A | * | 1/1995 | Stuart et al. ................ | 280/149.2 |
| 5,470,096 | A | * | 11/1995 | Baxter .................... | 280/124.116 |
| 6,073,947 | A | * | 6/2000 | Gottschalk et al. .... | 280/124.128 |
| 6,158,773 | A | * | 12/2000 | Verhaeghe .................... | 280/787 |
| 6,189,901 | B1 | * | 2/2001 | Smith et al. .................. | 280/86.5 |
| 6,213,507 | B1 | * | 4/2001 | Ramsey et al. ............... | 280/788 |
| 6,425,593 | B2 | * | 7/2002 | Fabris et al. .................. | 280/104 |
| 6,679,517 | B2 | * | 1/2004 | Proia ............................ | 280/682 |
| 7,156,422 | B2 | * | 1/2007 | Verhaeghe .................... | 280/789 |
| 7,461,865 | B2 | * | 12/2008 | Adams ......................... | 280/789 |
| 7,658,412 | B2 | * | 2/2010 | Ramsey et al. ............... | 280/784 |
| 7,731,211 | B2 | * | 6/2010 | Ramsey ................... | 280/124.31 |
| 2001/0035622 | A1 | * | 11/2001 | Fabris et al. .................. | 280/104 |
| 2002/0180170 | A1 | * | 12/2002 | Anderson ............. | 280/124.128 |
| 2003/0001376 | A1 | * | 1/2003 | Verhaeghe .................... | 280/781 |
| 2003/0205870 | A1 | * | 11/2003 | Dunlap et al. ............. | 280/6.157 |
| 2006/0249923 | A1 | * | 11/2006 | Ramsey ................. | 280/124.131 |

* cited by examiner

*Primary Examiner* — Ruth Ilan
*Assistant Examiner* — James English
(74) *Attorney, Agent, or Firm* — G. Brian Pingel; Camille L. Urban (57) ABSTRACT

An improved suspension that may be used in any dynamically loaded beam structure, such as a trailer chassis. Specifically, an improved spring hanger and method for attachment are discussed, in which the improved spring hanger is welded to the web of a support beam, where stresses are lower, as opposed to the bottom flange thereof. Methods are provided for welding the spring hanger to said beam alongside as well as in contact with existing, transverse support members.

13 Claims, 8 Drawing Sheets

SPRING HANGER AND METHOD FOR ATTACHMENT

CROSS-REFERENCE TO RELATED APPLICATIONS

None

BACKGROUND OF THE INVENTION

1. Field of the Invention

The present invention relates generally to suspension systems for vehicles. Specifically, the invention relates to the attachment of spring assemblies to a vehicle chassis, such as to the frame of a trailer. A spring hanger and a method of attaching the same are disclosed.

2. Description of the Prior Art

Trailer suspensions are almost exclusively manufactured as a separate component that is subsequently attached to the trailer chassis during assembly. Suspension systems are well known in the art, as are hangers for attaching suspension components such as springs or leaf springs to a vehicle or trailer chassis. Suspensions may be attached with bolts or other fasteners, but on steel framed trailers the most common method of attachment is welding. Welding is economical as it saves time, materials and weight.

Typically, a spring hanger in the shape of an upside-down U is welded to the lower flange of a frame member, such as a longitudinal i-beam or other rail, so that two spaced apart, substantially parallel plates extend downward. Springs and other suspension components are secured to openings provided in the plates.

As trailer design and manufacturing capabilities have improved, the use of higher strength steel in the support beams has allowed for greater stress and strain in the beam and specifically in the flange to which suspension components are attached. This stress is transferred to the suspension brackets and associated welds. The most highly stressed and critical part of the beam is the bottom flange.

Higher strength steel necessitates more critical weld procedures, and as such is more sensitive to deviations from these procedures. In spread axle and multi-axle configurations, front spring hangers in particular need to be attached to the beam in a relatively forward position, where the stresses on the beam are higher as compared to the rear. In dynamic loading situations, such as those experienced by a moving trailer, cyclical stress occurs which can in turn lead to metal fatigue or failure. Specifically, by welding a bracket such as a spring hanger to the bottom flange of the beam, an abrupt change in the beam structure occurs. This results in localized high stress and accelerated fatigue.

A need exists for an improved spring hanger and method of attachment permitting the hanger to be attached to, and thus transferring the suspension forces to, a part of the beam structure such as the web that is not as highly stressed. While optimal location can be determined by stress analysis, the preferred point of attachments is on the web, roughly midway between the top of the beam and the bottom flange.

SUMMARY OF THE INVENTION

The present invention relates to an improved suspension that may be used in any dynamically loaded beam structure, such as a trailer chassis. More particularly, the invention relates an improved spring hanger and method for attachment, in which the spring hanger is welded directly to the web of a support beam, where stresses are lower, as opposed to the bottom flange of a support beam. Methods are provided for welding the spring hanger alongside as well as in contact with existing, transverse support members.

It is a first object of the present invention to provide a spring hanger that is relatively simple and inexpensive to manufacture.

It is a further object of the present invention to provide a spring hanger that is capable of being retrofitted onto existing vehicles.

It is yet a further object of the present invention to provide a method for attaching a spring hanger to a lesser stressed portion of the support beam structure.

It is a further object still of the present invention to provide a method for attaching a spring hanger immediately adjacent to or in contact with an existing transverse support member.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
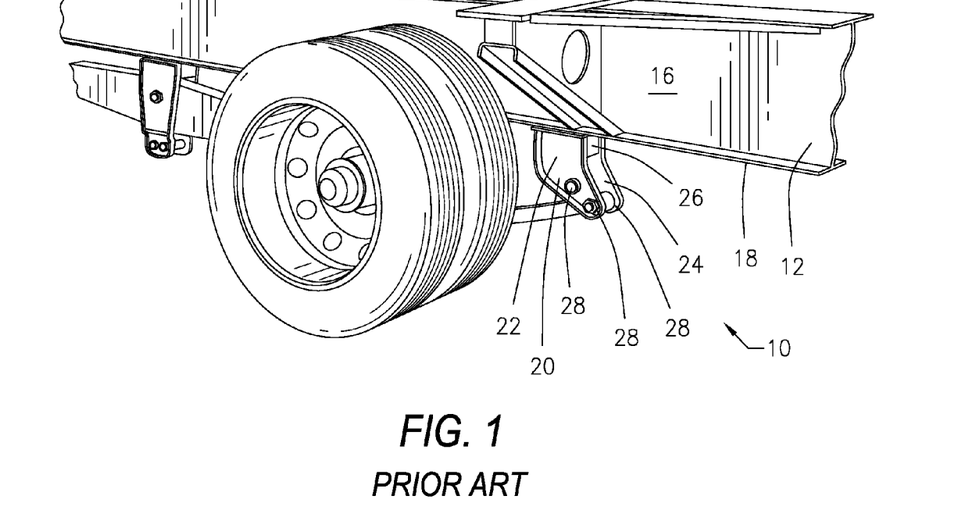
FIGS. 1 and 2 are perspective views of prior art spring hangers.
Figure 2:
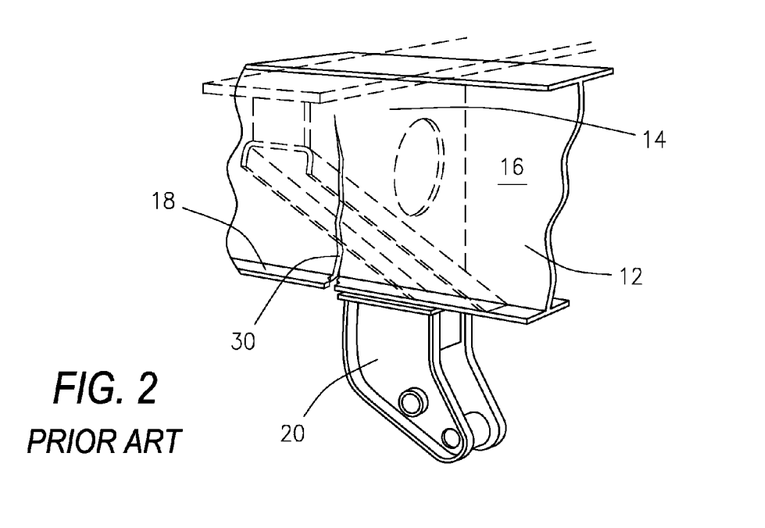

FIGS. 1 and 2 depict a portion of a typical prior art trailer suspension system 10. Visible chassis components include a longitudinal beam 12 and a transverse or lateral support member 14, the latter of which intersects beam 12 at approximately a ninety degree (90°) angle. Beam 12 comprises a web 16 and a bottom flange 18. Beam 12 and bottom flange 18 are both substantially horizontal. Attached to bottom flange 18 is a conventional spring hanger 20. Hanger 20 comprises a first plate 22, a second plate 24, and a spring seat 26, and is roughly in the shape of an upside-down U. Corresponding openings 28 are provided in first and second plates 22, 24 for attaching additional suspension components such as radius rods, springs, leaf springs, air-ride suspensions or the like. The outer surface of spring seat 26, away from plates 22, 24, is welded directly to the lower surface of bottom flange 18. Turning to FIG. 2, persons skilled in the art will appreciate that the stresses of the vehicle suspension system are transferred directly to the bottom flange 18 of beam 12, and that failures 30 affecting both the bottom flange 18 and web 16 may occur.

Figure 3:
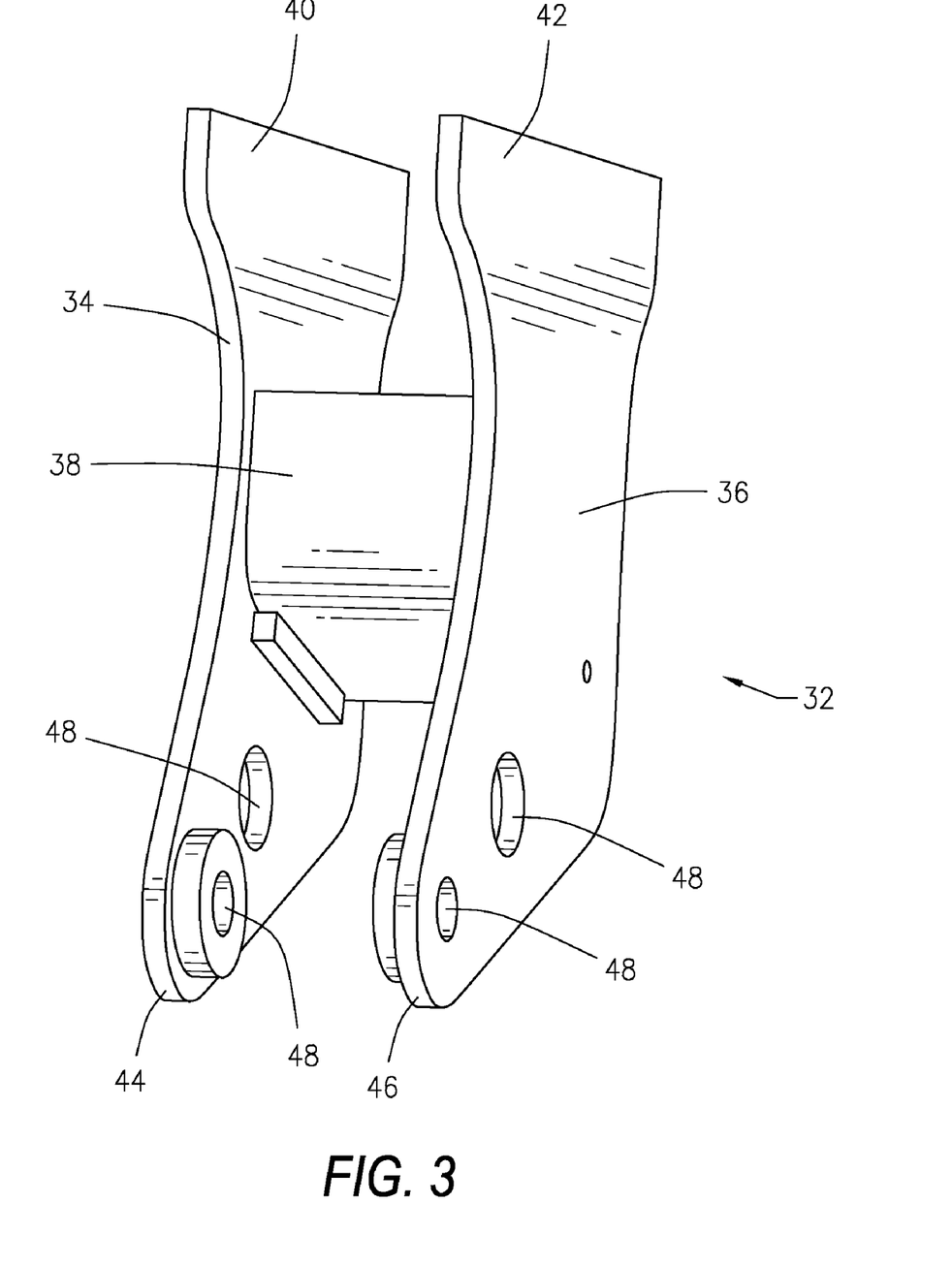
FIG. 3 is a perspective view of the spring hanger of the present invention.

An improved spring hanger 32 is illustrated in FIG. 3. Hanger 32 comprises a bracket having a first plate 34 and a second plate 36 in spaced and substantially parallel relation. Disposed between and secured to first and second plates 34, 36 is spring seat 38. Spring seat 38 is preferably hollow and approximately ½" in thickness. Hanger 32 may be used in a forward or rearward position about the trailer, although it is particularly well-suited for forward mounts where stresses are highest.

First end 40 of first plate 34 and first end 42 of second plate 36 extend away from spring seat 38 in an upward direction, while second end 44 of first plate 34 and second end 46 of second plate 36 extend away from spring seat 38 in the opposite (or a downward) direction. Hence, first ends 40, 42 may also be referred to as upper ends, while second ends 44, 46 may be referred to as lower ends. Thus, when viewed in side perspective, hanger 32 resembles an H. It will be appreciated that the separation between upper ends 40, 42 need be sufficiently large to fit around and over the bottom flange of the beam to which hanger 32 is to be secured. Lower ends 44, 46 are provided with corresponding openings 48 for attaching additional suspension components such as springs (not shown).

Figure 4:
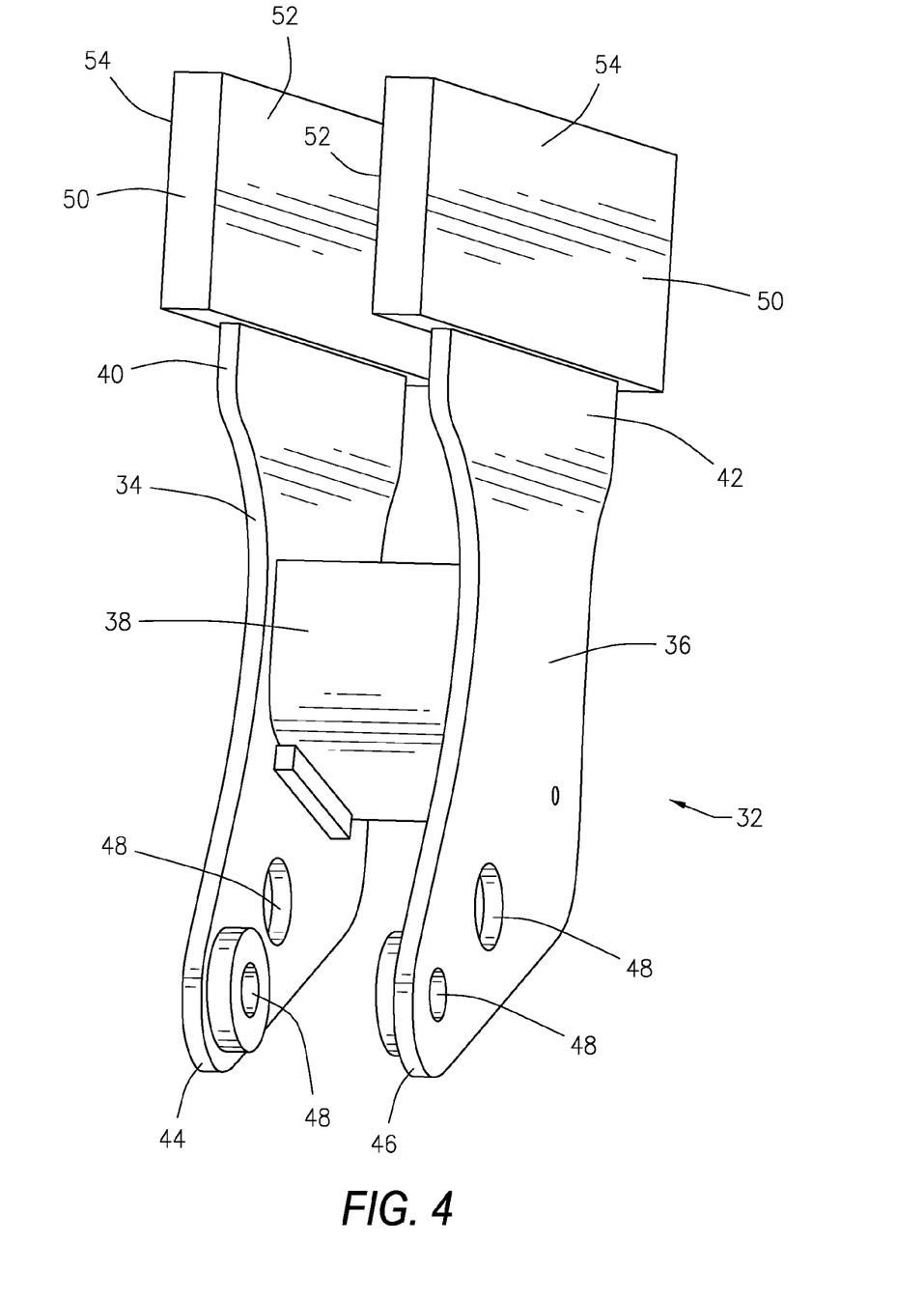
FIG. 4 is a perspective view of an embodiment of the spring hanger of the present invention.
Figure 4A:
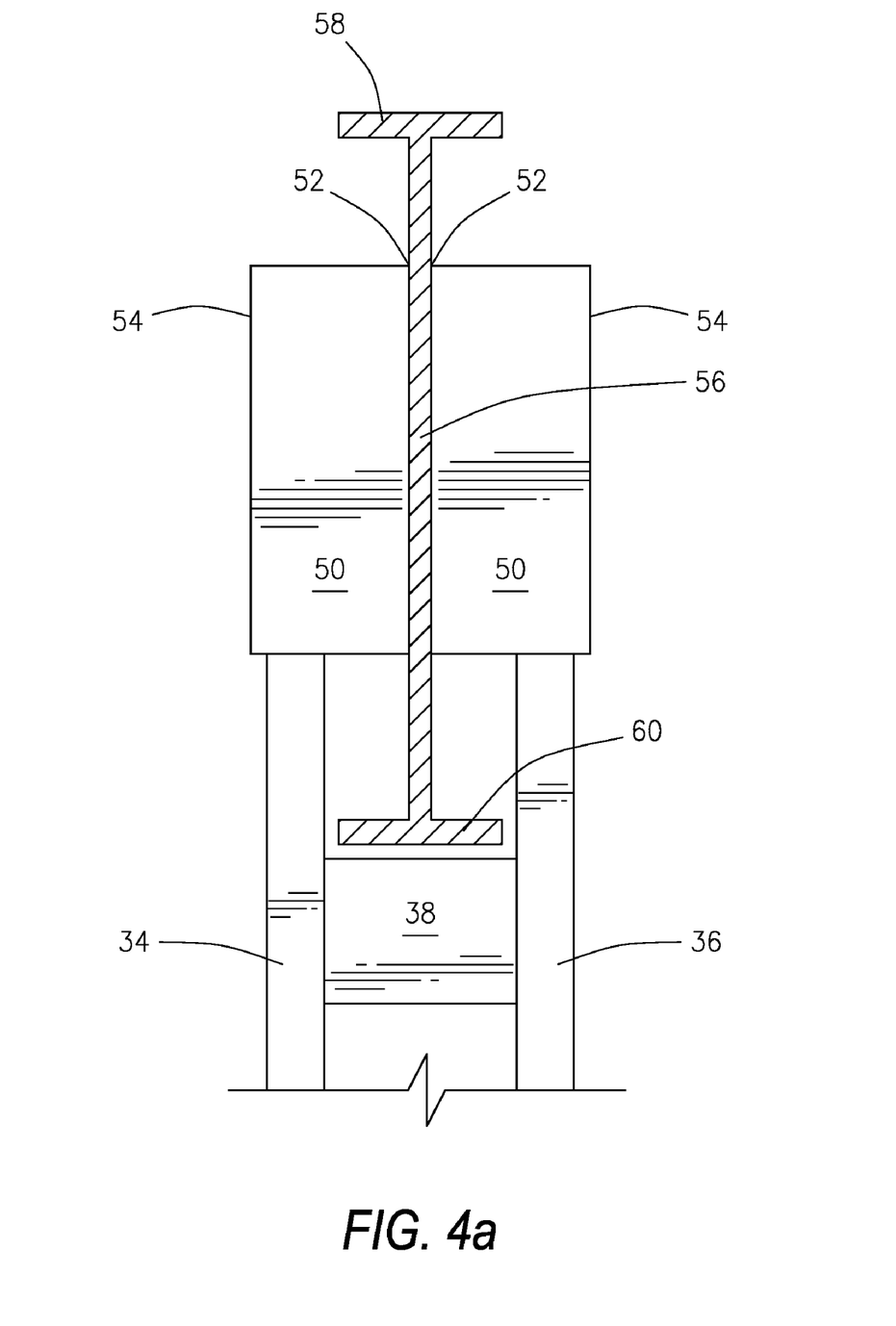
FIG. 4a is partial end view based on the embodiment depicted in FIG. 4.

With respect to FIGS. 4 and 4*a*, hanger 32 further comprises a pair of weld members 50. Weld members 50 may be separate components or may comprise and be contiguous with the uppermost portions of upper ends 40, 42 of plates 34, 36. Weld members 50, which may in certain embodiments be tubular and hollow, and have a first end 52 and a second end 54. First ends 52 of weld members 50 are welded to web 56 of beam 58 (not shown in FIG. 4) utilizing conventional welding techniques and parameters. The beam 58 comprises a web 56 and a lower flange 60. Persons skilled in the art will appreciate that welding techniques and parameters will vary depending on the materials involved. Also variable are the surface areas to be welded, such as whether the entire perimeter of first end 52 of weld member 50 is welded or a portion thereof. Second ends 54 of weld members 50 extend away from web 56 of beam 58, and correspond spatially with upper ends 40, 42 of plates 34, 36. Hence, first end 52 may also be referred to as the inner end of weld member 50, and second end 54 as the outer end. Where weld members 50 comprise separate components, upper ends 40, 42 of plates 34, 36 are welded directly to weld members 50. The sequence of welds may vary.

It is noted that weld member 50 may be equal or substantially equal in width to first and second plates 34, 36 of hanger 32, but this is not a requirement. Weld member 50 may be wider than or narrower than hanger 32, and weld member 50 need not be centered about hanger 32.

Figure 5:
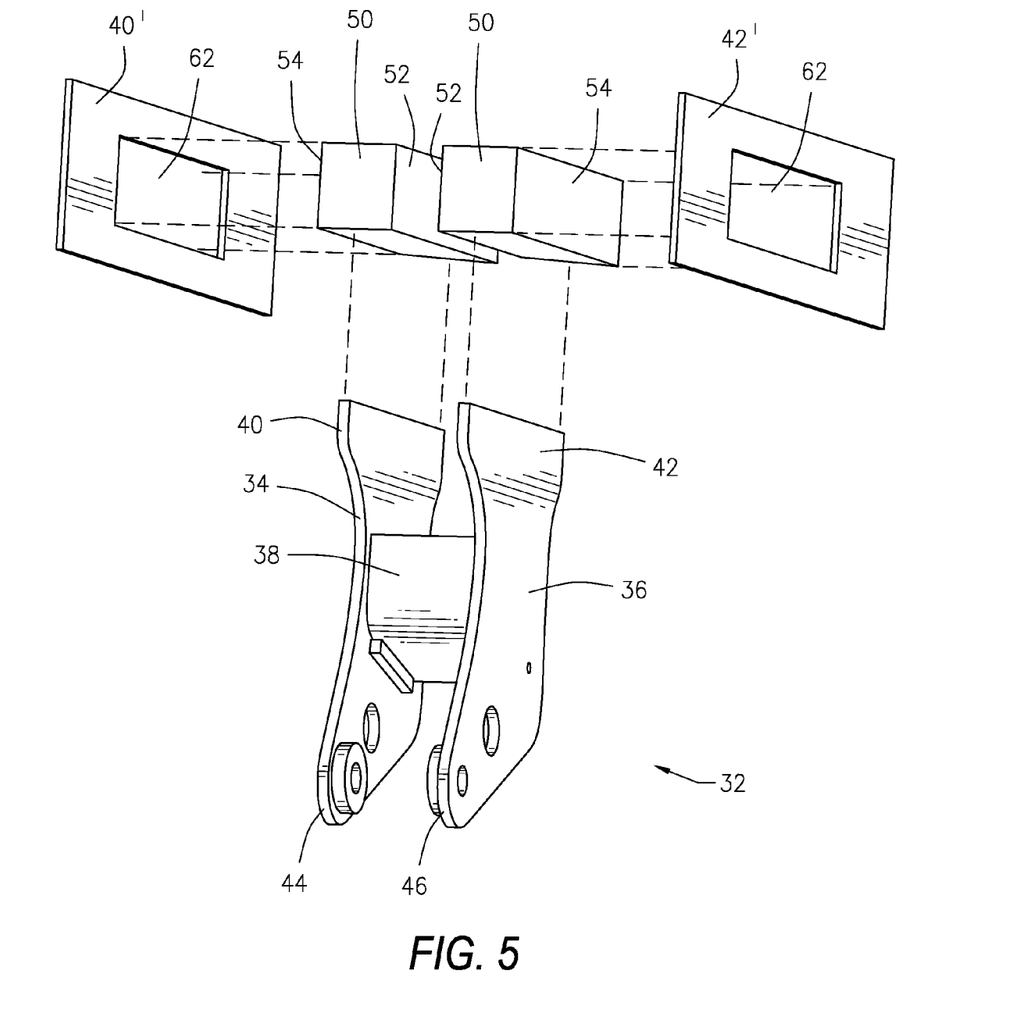
FIG. 5 is a partially exploded perspective view of an embodiment of the spring hanger of the present invention.
Figure 6:
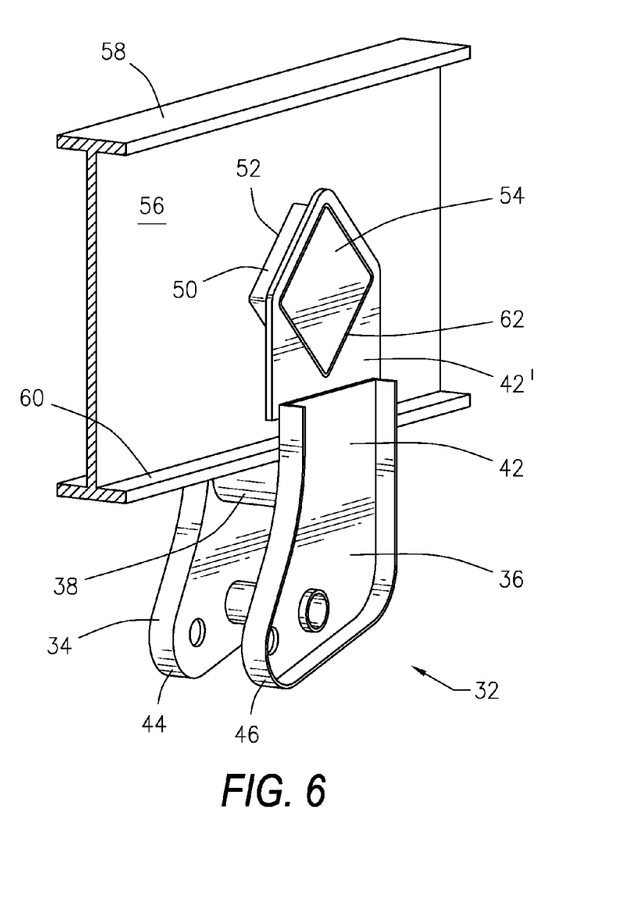
FIGS. 6-9 are perspective views of alternative embodiments of the present invention.
Figure 7:
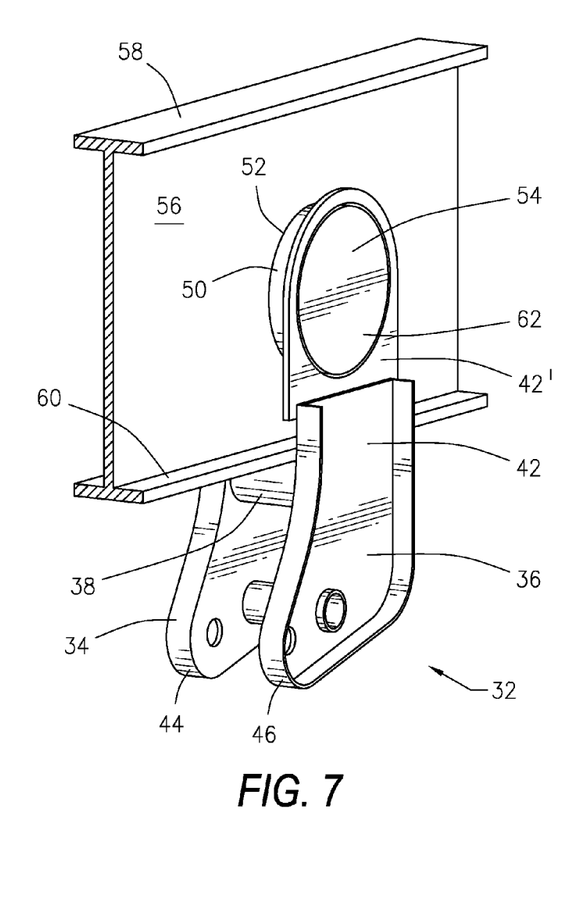

In an alternate embodiment, shown in FIGS. 5-7, upper ends 40, 42 of plates 34, 36 are provided with extensions 40', 42' respectively. Extensions 40', 42' have corresponding openings 62 that are similar in size and shape to outer ends 54 of weld members 50. By way of example, weld members 50 and openings 62 may be rectangular (FIGS. 5-6) or circular (FIG. 7). It will be appreciated that any corresponding shapes or orientations could be used. Preferably, openings 62 are only very slightly larger than outer ends 54 of weld members 50, such that weld members 50 fit within openings 62. This fit may be relatively loose, frictional or even snug, so long as the resulting junction between weld members 50 and plates 34, 36 is achievable and capable of securing by conventional welding. It is to be understood that outer ends 54 of weld members 50 are welded into place while disposed within openings 62. Again, weld sequence may vary.

Figure 8:
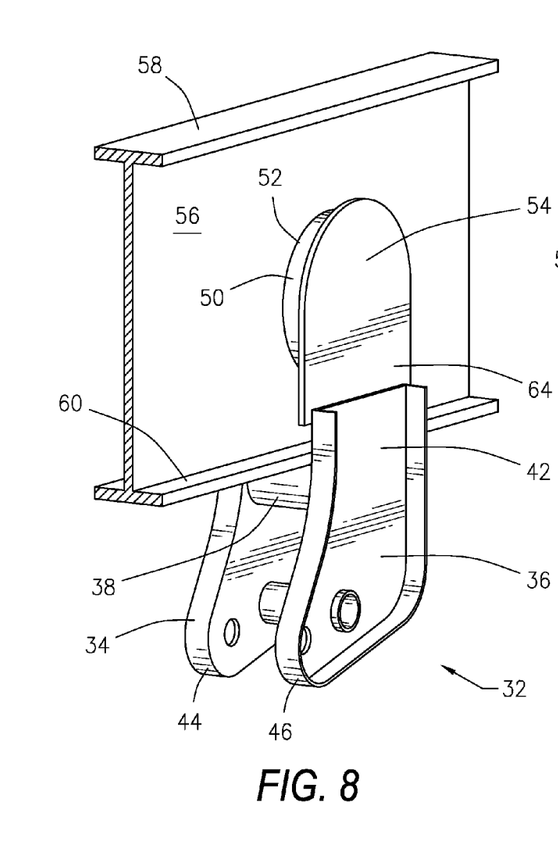

In yet another embodiment, shown in FIG. 8, weld member 50 is provided with a downwardly projecting flange 64, which is welded directly to upper ends 40, 42 of plates 34, 36.

Figure 9:
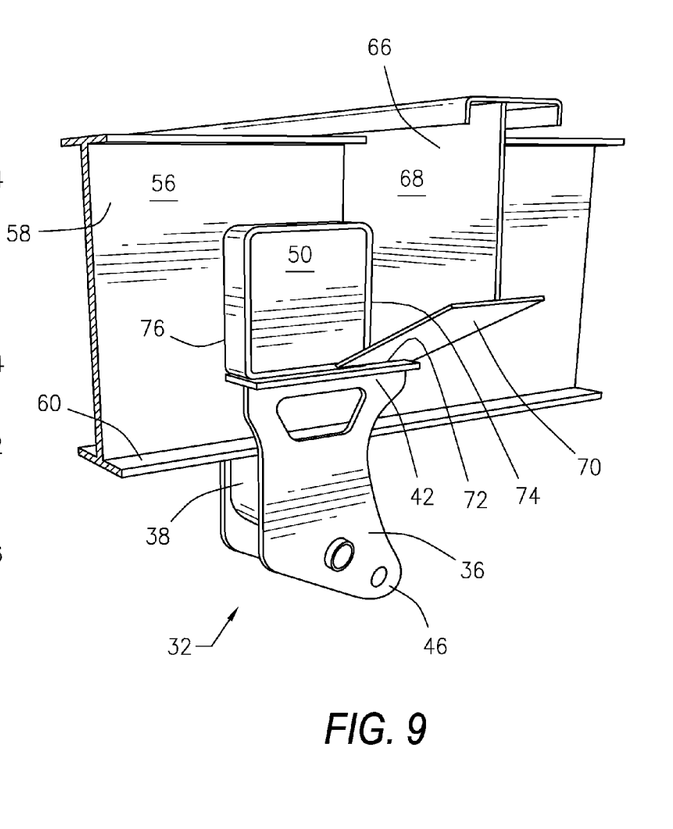

Referring back to FIG. 1, one or more transverse or lateral support members 14 may impede the attachment of weld member 50 to web 56 of beam 58, thus requiring modification. Turning to FIG. 9, lateral support member 66 is an i-beam comprising a web 68 and a lower flange 70. Portions of lower flange 70 may be cut away, leaving a notch 72, in order to accommodate a portion of weld member 50 and without substantially compromising the overall integrity of lateral support member 66. In yet another embodiment, also illustrated in FIG. 9, one or more surfaces 74 of weld member 50 may be welded directly to web 68 of lateral support member 66. This is in addition to surface 76 of weld member 50 which is welded to web 56 of beam 58 as described above, and is particularly useful where spring hanger 32 is desired to be placed immediately adjacent lateral member 66. Otherwise, weld member 50 may be attached to web 56 on all sides, with one side being in close proximity to web 68 of lateral support member 66.

The improved spring hanger has thus far been disclosed as being secured to both sides of a support beam, but this is neither a requirement nor a limitation. In yet another embodiment illustrated in FIGS. 10 and 11, spring hanger 78 comprises a first plate 80 and a second plate 82 in spaced, substantially parallel relation. Disposed between and secured to first and second plates 80, 82 is spring seat 84. Spring hanger 78 also comprises a substantially L-shaped weld bracket 86. Weld bracket 86 has a first leg 88 and a second leg 90, separated by a substantially right-angle bend 92. First leg 88 joins and may be welded to upper ends 94, 96 of plates 80, 82, respectively. Lower ends 98, 100 of plates 80, 82 are provided with corresponding openings 102 for attaching additional suspension components such as springs (not shown).

Figure 10:
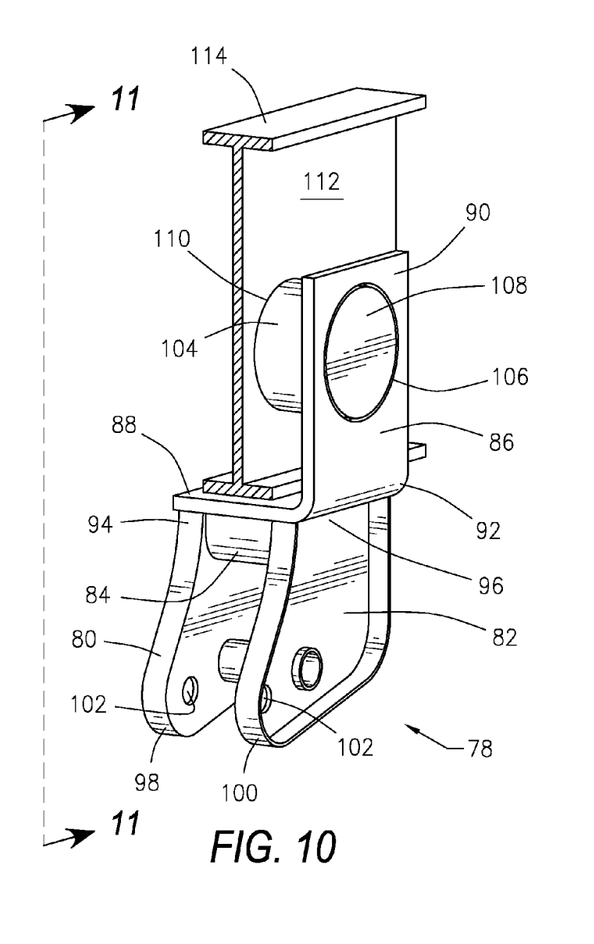
FIG. 10 is a perspective view of an embodiment of the spring hanger of the present invention.
Figure 11:
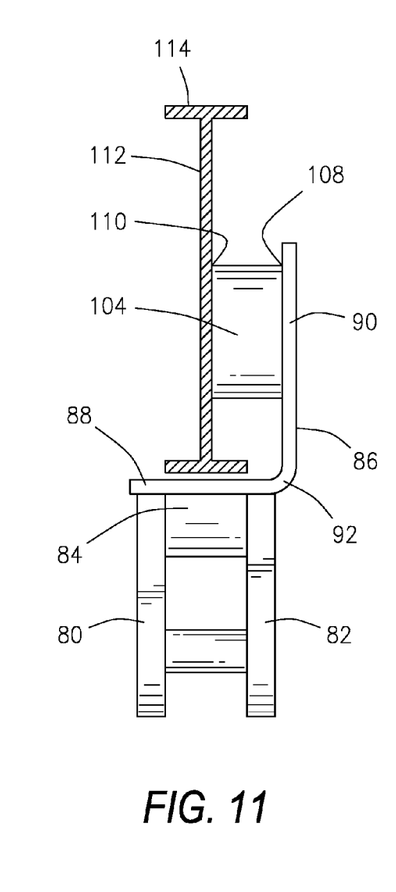
FIG. 11 is a cross-section drawn along line 11-11 of FIG. 10.

Associated with second leg 90 of weld bracket 86 is a weld member 104. Second leg 90 may have an opening 106 that is similar in size and shape to outer end 108 of weld member 104. By way of example, weld member 104 and opening 106 may be rectangular or circular. It will be appreciated that any corresponding shapes or orientations could be used. Preferably, opening 106 is only very slightly larger than outer end 108 of weld member 104, such that weld member 104 fits within opening 106. This fit may be relatively loose, frictional or even snug, so long as the resulting junction between weld member 104 and weld bracket 86 is achievable and capable of securing by conventional welding. It is to be understood that outer end 108 of weld member 104 is welded into place while disposed within opening 106. Inner end 110 of weld member 104 is welded directly to web 112 of beam 114.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention.

We claim:

1. A spring hanger for use in a vehicle suspension for attaching suspension components to a longitudinal support beam comprising a web and lower flange, comprising:
   a first plate and a second plate in spaced, substantially parallel relation;
   a spring seat disposed between and secured to said first and second plates;
   wherein opposite ends of said first and second plates extend away from said spring seat upwardly and downwardly such that when viewed in an end view the hanger is substantially H-shaped;
   a first pair of corresponding openings in the lower ends of said first and second plates adapted to receive a suspension component; and
   a first weld member associated with the upper end of said first plate and a second weld member associated with the upper end of said second plate, said weld members being spaced apart from one another and having inwardly projecting planar portions for reducing the space between said weld members and engaging the web of said support beam and being attached thereto.

2. The spring hanger of claim 1 further comprising a second pair of corresponding openings in the upper end of said first and second plates adapted to receive an end of said weld members.

3. The spring hanger of claim 2 wherein said second pair of corresponding openings and said weld members are essentially rectangular.

4. The spring hanger of claim 2 wherein said second pair of corresponding openings and said weld members are essentially circular.

5. The spring hanger of claim 1 wherein said weld members are rectangular in shape and are welded to said upper ends of said first and second plates.

6. The spring hanger of claim 1 wherein each of said weld members further comprise a flange, and said flanges are welded to said upper ends of said first and second plates.

7. The spring hanger of claim 1 wherein said suspension component is selected from the group consisting of springs, leaf springs, and air-ride suspensions.

8. A method for attaching a spring hanger to a traverse support member of a vehicle chassis, wherein said member comprises a web and a lower flange, said method comprising the steps of:
   providing a spring hanger having a first plate and a second plate in spaced, substantially parallel relation, and a spring seat disposed between and secured to said first and second plates, wherein opposite ends of said first and second plates extend away from said spring seat upwardly and downwardly such that when viewed in perspective the hanger is substantially H-shaped;
   fitting said hanger about said support member such that said upper ends of said first and second plates extend above said lower flange of said member;
   providing a pair of weld members associated with said upper ends of said first and second plates, each of said weld members having inwardly projecting planar portions for engaging and being attached to said web of said support member; and
   welding said weld members directly to said web.

9. The method of claim 8 further comprising the step of modifying an existing transverse support member to accommodate said weld members.

10. The method of claim 9 wherein the existing transverse support member comprises a flange, and said existing transverse support member is modified by cutting away a portion of said flange.

11. The method of claim 8 wherein the upper ends of said first and second plates further comprise a pair of corresponding openings each adapted to receive an end of said weld members, said method further comprising the steps of fitting said upper ends of said plates over said weld members and welding said plates to said weld members.

12. The method of claim 8 further comprising the step of welding at least a portion of said weld member to an existing transverse support member.

13. The method of claim 12 wherein said existing transverse support member comprises a second web and wherein said portions of said weld members are welded to said second web.

* * * * *